(12) United States Patent
Yoshimura et al.

(10) Patent No.: US 7,948,673 B2
(45) Date of Patent: May 24, 2011

(54) OPTICAL WAVELENGTH CONVERSION ELEMENT HAVING A CESIUM-LITHIUM-BORATE CRYSTAL

(75) Inventors: Masashi Yoshimura, Suita (JP); Takatomo Sasaki, Suita (JP); Yusuke Mori, Suita (JP); Muneyuki Nishioka, Suita (JP); Tomotaka Katsura, Tokyo (JP); Tetsuo Kojima, Tokyo (JP); Junichi Nishimae, Tokyo (JP)

(73) Assignees: Osaka University, Suita-shi (JP); Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 12/233,174

(22) Filed: Sep. 18, 2008

(65) Prior Publication Data
US 2009/0080475 A1 Mar. 26, 2009

Related U.S. Application Data

(63) Continuation of application No. PCT/JP2007/055072, filed on Mar. 14, 2007.

(30) Foreign Application Priority Data

Mar. 18, 2006 (JP) .................................. 2006-075753

(51) Int. Cl.
*G02F 1/35* (2006.01)
*H01S 3/10* (2006.01)
(52) U.S. Cl. ........................... 359/328; 359/326; 372/22
(58) Field of Classification Search .......... 359/326–332; 385/122; 372/21–22; 423/277
See application file for complete search history.

(56) References Cited

U.S. PATENT DOCUMENTS

| 5,862,163 | A | * | 1/1999 | Umezu et al. ................. 372/21 |
| 5,998,313 | A | | 12/1999 | Sasaki et al. |
| 6,741,620 | B2 | * | 5/2004 | Gerstenberger et al. ........ 372/22 |
| 7,744,696 | B2 | * | 6/2010 | Sasaki et al. .................... 117/19 |
| 2002/0000541 | A1 | | 1/2002 | Sasaki et al. |
| 2005/0225837 | A1 | | 10/2005 | Kojima et al. |

FOREIGN PATENT DOCUMENTS

JP 2744604 2/1998

(Continued)

OTHER PUBLICATIONS

Yukihiro Morimoto et al., "Water-associated surface degradation of $CsLiB_6O_{10}$ crystal during harmonic generation in the ultraviolet region", J. Mater. Res., vol. 16, No. 7, pp. 2082-2090, Jul. 2001.

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

An optical wavelength conversion element includes a cesium-lithium-borate crystal processed into a 10-mm long optical element cut in an orientation that allows a fourth harmonic of a Nd:YAG laser to be generated. A transmittance (Ta) at 3589 $cm^{-1}$ in an infrared transmission spectrum of the optical element is used as an index that indicates a content of water impurities in the crystal and is independent of a polarization direction. An actual measurement of the transmittance Ta is at least 1%, without taking into account loss at an optically polished surface of the crystal. A wavelength conversion device, a ultraviolet laser irradiation apparatus, a laser processing system, and a method of manufacturing an optical wavelength conversion element are also described.

9 Claims, 6 Drawing Sheets

FOREIGN PATENT DOCUMENTS

| | | |
|---|---|---|
| JP | 2812427 | 8/1998 |
| JP | 11-271820 | 10/1999 |
| JP | 11-288012 | 10/1999 |
| JP | 3115250 | 9/2000 |
| JP | 2001-296568 | 10/2001 |
| JP | 2003-295241 | 10/2003 |
| JP | 2006-69820 A | 3/2006 |
| WO | WO 02/48786 A1 | 6/2002 |
| WO | WO 2004/0796060 A1 | 9/2004 |

OTHER PUBLICATIONS

L. Kovács et al., "IR absorption spectroscopy of water in $CsLiB_6O_{10}$ crystals", Optical Materials vol. 24, pp. 457-463, 2003.

Muneyuki Nishioka et al., "Improvement in UV Optical Properties of $CsLiB_6O_{10}$ by Reducing Water Molecules in the Crystal", Japanese Journal of Applied Physics, vol. 44, No. 22, pp. L699-L700, 2005.

L. Isaenko et al., "$CsLiB_6O_{10}$ crystals with Cs deficit: structure and properties", Journal of Crystal Growth, 282, pp. 407-413, 2005.

Third Party Information Offer Form against the corresponding Japanese Patent Application No. 2006-075753 dated Jun. 20, 2008. (with partial translation).

L. Kovacs et al. "FTIR Spectroscopy of Borate Crystals", SPIE, vol. 3724, pp. 256-259, 1999.

Office Action issued Feb. 1, 2011, in Japanese Patent Application No. 2006-075753, filed Mar. 18, 2006 (with partial English-language translation).

* cited by examiner

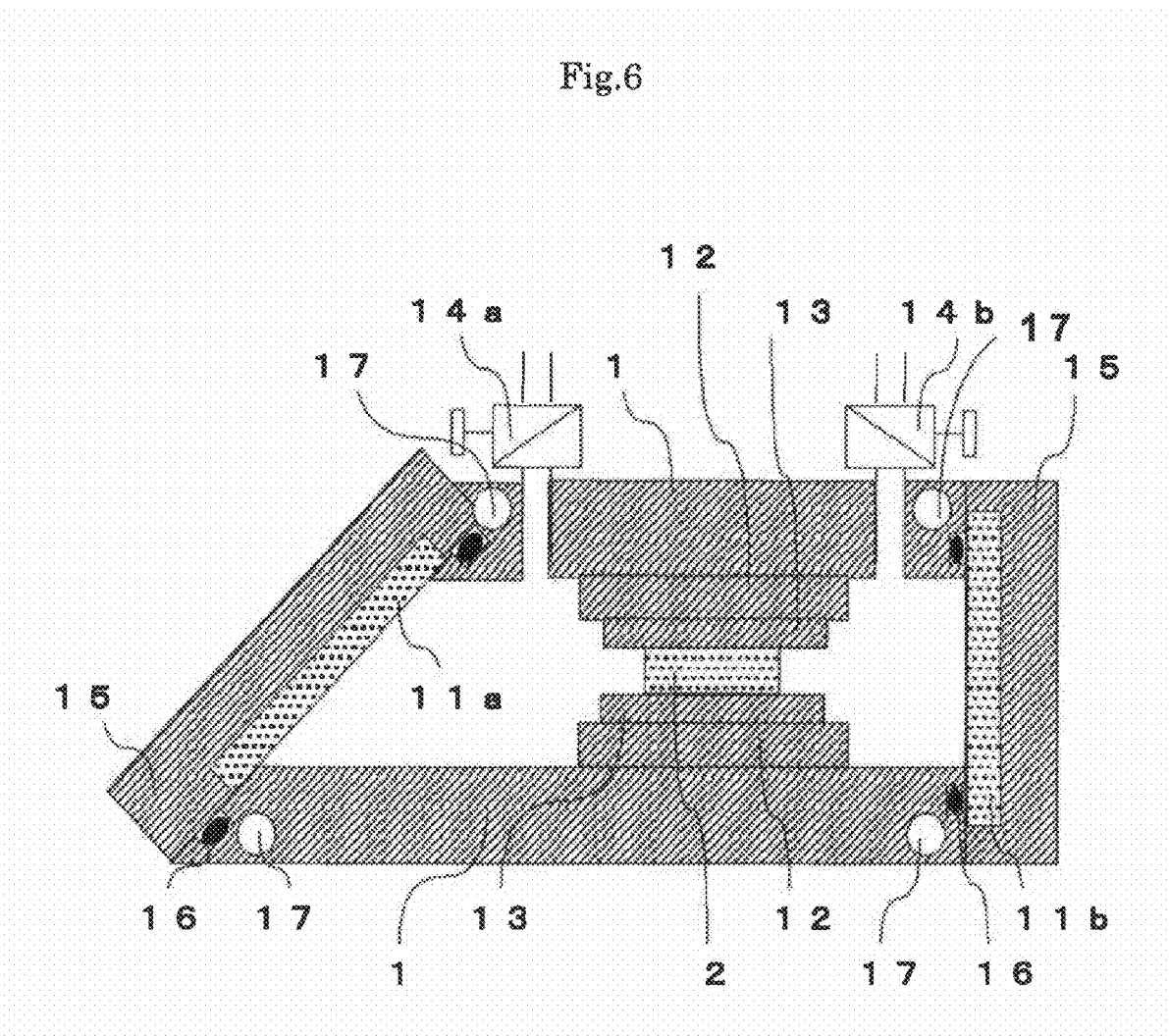

OPTICAL WAVELENGTH CONVERSION ELEMENT HAVING A CESIUM-LITHIUM-BORATE CRYSTAL

CROSS-REFERENCE TO RELATED APPLICATIONS

This application is a Continuation of International Patent Application No. PCT/JP2007/055072, filed Mar. 14, 2007, and claims priority to Japanese Patent Application No. 2006-075753, filed Mar. 18, 2006. The contents of PCT/JP2007/055072 are incorporated herein by reference in their entirety.

BACKGROUND OF THE INVENTION

1. Field of the Invention

The present invention relates to optical wavelength conversion elements, methods of manufacturing optical wavelength conversion elements, wavelength conversion devices, ultraviolet laser irradiation apparatuses, and laser processing systems.

2. Discussion of the Background

In an ultraviolet laser, a method is employed in which ultraviolet light is generated from a source laser that emits light in the infrared region through multiple uses of a nonlinear optical effect of an optical wavelength conversion element. In the method, for an optical wavelength conversion element that is used in, for example, the final stage, a cesium-lithium-borate crystal that is typified by a crystal with a chemical composition, $CsLiB_6O_{10}$, (hereinafter also referred to as "CLBO") and that was developed by the present inventors is a crystal capable of generating an ultraviolet laser highly efficiently. It has been reported that the CLBO crystal can generate, for example, fourth harmonic (with a wavelength of 266 nm) and fifth harmonic (with a wavelength of 213 nm) of a neodymium-doped yttrium aluminium garnet ($Nd:Y_3Al_5O_{12}$ hereinafter also referred to as Nd:YAG) laser as well as light with a wavelength of 193 nm that is equal to the emission wavelength of an ArF excimer laser, with high conversion efficiency.

However, since the CLBO crystal is deliquescent, there is a problem in that the crystal optical surface reacts with, for example, moisture in the atmosphere, which results in a deterioration in quality or laser damage and also causes a change in internal refractive index. Accordingly, a technique has been developed in which the crystal is pretreated by being heated (annealed) at 100° C. or higher before it is used as an optical wavelength conversion element, or it is used in the state where it is heated at 150° C. (as described in JP 3115250 B, which is incorporated herein by reference in its entirety). Furthermore, there are the following proposals. That is, in order to prevent the optical wavelength conversion element from being deteriorated during the use, the crystal is disposed in a vacuum atmosphere (as described in JP 11(1999)-271820 A, which is incorporated herein by reference in its entirety), or the crystal used is disposed inside an optical cell sealed with a gas free from moisture (as described in JP 2003-295241 A or WO 2002/048786, each of which is incorporated herein by reference in its entirety). All of these techniques are intended to prevent element deterioration and laser damage that are caused by deliquescence of the CLBO crystal.

On the other hand, in an optical wavelength conversion element produced using a CLBO crystal, when the power of generated ultraviolet laser increases, a slight absorption thereof causes the inner part of the element to generate heat to form a nonuniform temperature distribution therein. This gives rise to distribution of changes in refractive index, which results in a region that departs from the wavelength conversion condition (phase matching condition). Therefore, in order to solve both the problems of the aforementioned moisture prevention and the generation of the phase mismatch region, there is a method in which a CLBO crystal is used in the state where it is heated at 150° C. However, since in this method, it is difficult to avoid the effect of self-heating, the output power obtained when a high output ultraviolet laser is generated tends to be lower than the theoretical value obtained with no consideration given to the heat effect. Accordingly, in order to increase the output power of an ultraviolet laser, input of a higher power laser and conditions for highly condensing light are indispensable. This, however, works as a factor that causes damage and deterioration of the CLBO crystal, and thereby reliability of long-term operation is deteriorated, which is a problem. The vicinity of the laser beam condensing part inside the crystal is subjected to an environment where an "internal laser damage" in which heat cracks occur due to the heat generated by the ultraviolet laser tends to be caused. Furthermore, since the CLBO crystal has the property that the refractive index value decreases with heat generation, the CLBO crystal exhibits a "thermal lens effect" in which the diameter of a laser beam light collected for improving the ultraviolet laser conversion efficiency disadvantageously increases. Moreover, the use of a CLBO crystal in the state where it is heated at 150° C. requires time for starting up (activating) the ultraviolet laser irradiation apparatus and therefore there has been a problem in operability. Thus there have been demands for the development of a CLBO crystal that can be used at room temperature.

On the other hand, it has been known that water, contained as an impurity in a CLBO crystal, causes absorption in an infrared light region (as described in Y. Morimoto et al., J. Mater. Res. Vol. 16, pp. 2082-2090 (2001) or L. Kovacs et al., Opt. Mater. Vol. 24, pp. 457-463 (2003), each of which is incorporated by reference herein in its entirety). In response, the present inventors developed a technique for reducing the water impurities inside the CLBO through a heat treatment to improve the threshold of the CLBO crystal internal laser damage (as described in M. Nishioka et al., Jpn. J. Appl. Phys. Vol. 44, pp. L699-L700 (2005), which is incorporated by reference herein in its entirety). However, the CLBO crystal produced by this technique has a problem in that an output saturation phenomenon occurs in which the output power of ultraviolet laser generated also increases up to a certain region with an increase in source laser input power, but when the input power exceeds a certain value, the output power stops increasing. Accordingly, there are demands for the development of a technique for improving the output power of ultraviolet laser according to the input power. Such use at room temperature and improvement in ultraviolet laser output also are problems to be solved in all the cesium-lithium-borate crystals including the CLBO crystal.

SUMMARY OF THE INVENTION

Accordingly, one object of the present invention is to provide a novel optical wavelength conversion element that can improve the output power of an ultraviolet laser according to the input power and also can be used at room temperature, a method of manufacturing the optical wavelength conversion element, as well as a wavelength conversion device, an ultraviolet laser irradiation apparatus, and a laser processing system, in each of which the optical wavelength conversion element is used.

In order to achieve the aforementioned object, the optical wavelength conversion element in an embodiment of the present invention is an optical wavelength conversion element including a cesium-lithium-borate crystal, wherein the content of water impurities in the crystal is a content in the case of which when the crystal is processed into a 10-mm long optical element cut in an orientation that allows fourth harmonic of a Nd:YAG laser to be generated, a transmittance (Ta) at 3589 cm$^{-1}$ in the infrared transmission spectrum of the optical element is used as an index and is independent of a polarization direction, and the actual measurement thereof is at least 1%, with loss at the optically polished surface being not taken into account.

The manufacturing method in an embodiment of the present invention is a method of manufacturing the optical wavelength conversion element in an embodiment of the present invention, wherein the method includes: a step of preparing a cesium-lithium-borate crystal, a first moisture removal step in which the crystal is heated in the atmosphere at 100° C. or higher for at least 24 hours, and a second moisture removal step in which the crystal is heated under a dry gas atmosphere at 100° C. or higher for at least 24 hours.

The optical wavelength conversion device in an embodiment of the present invention is a wavelength conversion device that converts the wavelength of light by transmitting the light through an optical wavelength conversion element, wherein the optical wavelength conversion element is the optical wavelength conversion element in an embodiment of the present invention.

The ultraviolet laser irradiation apparatus in an embodiment of the present invention is an ultraviolet laser irradiation apparatus that includes a laser light source and a wavelength conversion device and that converts the wavelength of light emitted from the laser light source to generate an ultraviolet laser, wherein the wavelength conversion device is the wavelength conversion device in an embodiment of the present invention.

The laser processing system in an embodiment of the present invention is a laser processing system including an ultraviolet laser irradiation apparatus, wherein the ultraviolet laser irradiation apparatus is the ultraviolet laser irradiation apparatus in an embodiment of the present invention.

As described above, in the optical wavelength conversion element in an embodiment of the present invention, since a cesium-lithium-borate crystal is used in which moisture has been removed to an extent that allows the transmittance property, specifically a transmittance (Ta) of at least 1%, to be exhibited, the output saturation phenomenon does not occur, and as described later in the examples, the output power can be improved according to the input power, and furthermore, it can demonstrate the performance that is at least equivalent to that of conventional crystals heated at 150° C., even at room temperature. Accordingly, the wavelength conversion device, the ultraviolet laser irradiation apparatus, and the laser processing system, in each of which the optical wavelength conversion element in an embodiment of the present invention is used, have advantages in high performance, high reliability in long term operation, and excellent operability with short rise time. Furthermore, the manufacturing method in an embodiment of the present invention allows the optical wavelength conversion element in an embodiment of the present invention to be manufactured easily. However, the optical wavelength conversion element in an embodiment of the present invention may be manufactured by a method other than the aforementioned manufacturing method. Moreover, the optical wavelength conversion element in an embodiment of the present invention may be used at room temperature or may be heated suitably (for instance, 150° C.) in use. In the following disclosure, the term "water impurities" denotes water contained as impurities in the crystal.

BRIEF DESCRIPTION OF THE DRAWINGS

A more complete description of the invention and many of the attendant advantages thereof will be readily obtained as the same becomes better understood by reference to the following detailed description when considered in connection with the accompanying drawings, wherein:

FIG. 6 is a cross-sectional view showing the configuration of a further example of the wavelength conversion device according to an embodiment of the present invention.

DESCRIPTION OF THE PREFERRED EMBODIMENTS

Figure 1:
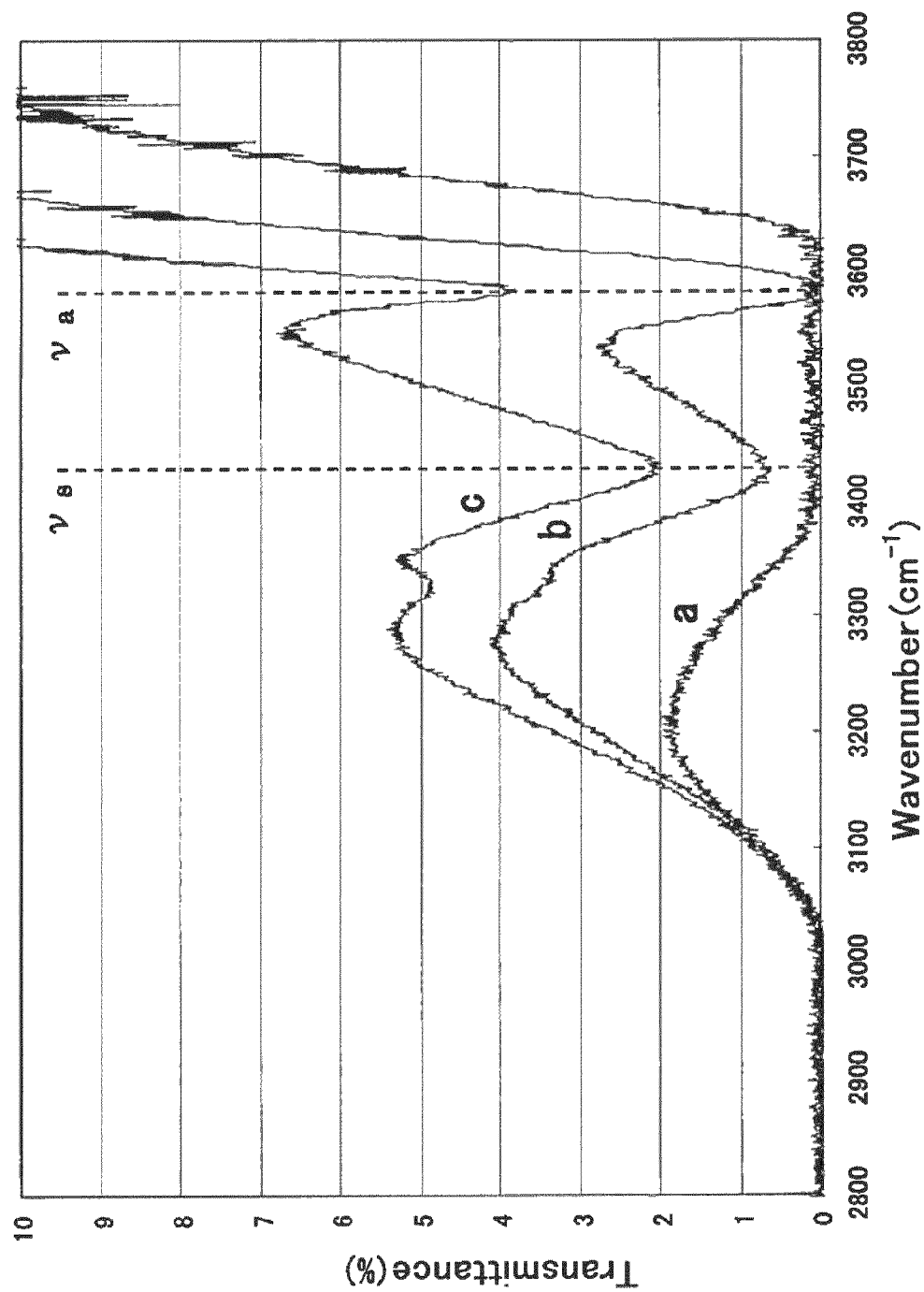
FIG. 1 is a graph showing the measurement results of transmission spectra in an infrared region according to one example of the present invention.

An optical wavelength conversion element according to an embodiment of the present invention can increase the output characteristics according to the input power and also can be used at room temperature. Accordingly, a wavelength conversion device, a laser irradiation apparatus, and a laser processing system, in each of which an optical wavelength conversion element according to an embodiment of the present invention is used, have high performance and excellent reliability even in the case of long term operation and also have excellent operability. Therefore, embodiments of the present invention can be used suitably in all the fields related to wavelength conversion lasers.

In an embodiment of the present invention, when the crystal is processed into a 10-mm long optical element cut in an orientation that allows a fourth harmonic of a Nd:YAG laser to be generated, the transmittance (Ta) at 3589 cm$^{-1}$ in the infrared transmission spectrum of the optical element is an index that indicates the content of water impurities in the crystal and does not limit the present invention in any other meaning than that. Accordingly, for example, the length 10 mm of the optical element is merely an element length at the aforementioned index, and the element length of the optical wavelength conversion element according to an embodiment of the present invention is determined suitably according to the intended use thereof.

The optical wavelength conversion element is not particularly limited. Examples thereof include elements of generating second harmonic, third harmonic, fourth harmonic, and fifth harmonic of a Nd:YAG laser as well as optical elements for emitting visible light/ultraviolet light such as a 193-nm wavelength light generation element and a 195-nm wavelength light generation element.

In an optical wavelength conversion element according to an embodiment of the present invention, it is preferable that the content of water impurities in the crystal be the content in the case of which when the crystal is processed into the optical element, the transmittance (Ta) at 3435 cm$^{-1}$ in the infrared transmission spectrum of the optical element is used as an index and is independent of a polarization direction, and the actual measurement thereof is at least 1.5%, with loss at the optically polished surface being not taken into account. As described above, the transmittance (Ts) is merely an index that indicates the content of water impurities in the crystal and does not limit the present invention in any other meaning than that.

In an optical wavelength conversion element according to an embodiment of the present invention, it is preferable that the crystal be one that has not been subjected to deterioration in its optical surface formed along the a-axis direction at the crystal surface.

In an optical wavelength conversion element according to an embodiment of the present invention, it is preferable that the crystal be a $CsLiB_6O_{10}$ crystal (CLBO crystal). Examples thereof also include CLBO crystals such as crystals obtained by partially replacing Cs or Li of the CLBO crystal by an alkali metal element, an alkaline-earth metal element, or another element, crystals obtained by adding impurities to the CLBO crystal, and crystals having nonstoichiometry in their chemical compositions.

In an optical wavelength conversion element according to an embodiment of the present invention, it is preferable that an optical surface of the crystal has been optically polished.

In a method of manufacturing an optical wavelength conversion element according to an embodiment of the present invention, the first moisture removal step may be omitted and the moisture of the crystal may be removed in the second moisture removal step. In a manufacturing method according to an embodiment of the present invention, in the first moisture removal step and the second moisture removal step, the pressure of the atmosphere is not particularly limited and it may be, for example, normal pressure or the atmosphere may be under a pressurized condition or a depressurized condition.

In a method of manufacturing an optical wavelength conversion element according to an embodiment of the present invention, the dry gas is not particularly limited. Examples thereof include argon gas, oxygen gas, and mixed gas thereof.

A wavelength conversion device according to an embodiment of the present invention may further include an optical cell provided with input and output optical windows, with the optical wavelength conversion element being disposed inside the optical cell.

Preferably, the optical cell further includes a temperature control unit and an atmosphere gas displacement unit.

In a wavelength conversion device according to an embodiment of the present invention having the optical cell, a moisture removal treatment can be carried out including a step for disposing a cesium-lithium-borate crystal inside the optical cell, with the crystal having not been subjected to a treatment for removing moisture, a first moisture removal step in which the crystal is heated in a normal atmosphere (e.g., a conventional lab or factory atmosphere) at 100° C. for at least 24 hours with the temperature control unit, and a second moisture removal step in which the inside of the optical cell is brought into a dry gas atmosphere with the atmosphere gas displacement unit and the crystal is heated therein at 100° C. or higher for at least 24 hours with the temperature control unit. In this embodiment, the first moisture removal step may be omitted and the moisture removal treatment may be carried out in the second moisture removal step. In a wavelength conversion device according to an embodiment of the present invention, the pressure of the atmosphere in the first moisture removal step and the second moisture removal step as well as during wavelength conversion is not particularly limited. It may be, for example, normal pressure, or the atmosphere may be under a pressurized condition or a depressurized condition.

In a wavelength conversion device according to an embodiment of the present invention, it is preferable that the wavelength conversion be carried out at room temperature.

In a wavelength conversion device according to an embodiment of the present invention, it is preferable that the wavelength conversion be carried out in an atmosphere of gas in which the content of nitrogen gas is less than that in air. This is to prevent the following. That is, in the case of ultraviolet generation, when nitrogen gas is contained in the atmosphere gas at a ratio equal to or higher than that of air, the nitrogen gas and the crystal surface components react with each other to generate cesium nitrate and this adheres to the crystal surface to cause a deterioration in optical properties. The atmosphere gas is not particularly limited. Examples thereof include argon gas, oxygen gas, and mixed gas thereof.

Next, embodiments of the present invention are described in detail. However, the present invention is not limited to the following embodiments.

An optical wavelength conversion element, according to an embodiment of the present invention, includes a cesium-lithium-borate crystal, and as described above, the crystal is preferably a CLBO crystal. The general properties of the CLBO crystal are, for example, as follows.

<General Properties of CLBO Crystal>
Chemical formula: $CsLiB_6O_{10}$
Molecular weight: 364.70
Crystal system: tetragon, uniaxial negative crystal
Lattice type: body-centered cubic lattice
Lattice constant: a=10.494 (1) Å (1.0494 nm)
　　b=8.939 (2) Å (0.8939 nm)
　　v=984.4 (3) Å (98.44 nm)
Space group: 142 (#122)
Crystal density: 2.461 g/cm$^3$
Transmission wavelength region: 180 to 2750 nm
Nonlinear optical constant: $d_{36}$=0.95 pm/V As described above, when the crystal of the present invention is processed into an optical element (with a length of 10 mm) cut in an orientation that allows fourth harmonic (266 nm) of a Nd:YAG laser to be generated, the transmittance (Ta) at 3589 cm$^{-1}$ in the infrared transmission spectrum of the optical element is independent of a polarization direction, and the actual measurement thereof is at least 1%, with loss at the optically polished surface being not taken into account. The Ta is preferably at least 1.5%, more preferably at least 2.0%, further preferably at least 2.5%, still further preferably at least 3.0%, and yet further preferably at least 3.5%. The element length, 10 mm, is preferably in the range of, for example, 10 mm ±0.2 mm, with consideration being given to errors caused in, for example, processing.

The transmittance (Ta) and the transmittance (Ts) are parameters that reflect the moisture content in the crystal. That is, in the crystal, water impurities cause absorption (va) at 3589 cm$^{-1}$ and absorption (vs) at 3435 cm$^{-1}$, and the absorption (va) denotes asymmetric stretching vibration of a OH group while the absorption (vs) denotes symmetric stretching vibration of an OH group. The transmittance (Ta) and the transmittance (Ts) are observed corresponding to those respective absorptions. Of the aforementioned two parameters, the transmittance (Ta) is the most important, and when water impurities are removed until a transmittance (Ta) of at least 1% is obtained, the generation of an output saturation phenomenon may be prevented. Thereby the output power can be improved according to the input power, and the problem of generation of a phase mismatch region can be solved even at room temperature without heating at 150° C. The present inventors discovered these arrangements, methods, and corresponding results for the first time and the arrangements, methods, and results are neither described nor suggested in any of the aforementioned patent documents and nonpatent documents. Furthermore, the room temperature is not particularly limited and may be the room temperature of the workplace such as a laboratory or a factory. Thus, the room temperature may be, for example, in the range of 0 to 50° C., in the range of 0 to 40° C., in the range of 0 to 30° C., in the range of 5 to 35° C., in the range of 10 to 30° C., or in the range of 20 to 30° C.

As described above, preferably, when the crystal of the present invention is processed into an optical element, the crystal exhibits the properties such that the transmittance (Ts) at 3435 $cm^{-1}$ in the infrared transmission spectrum of the optical element is independent of a polarization direction and the actual measurement of the transmittance (Ts) at 3435 $cm^{-1}$ in the infrared transmission spectrum is at least 1.5% and more preferably at least 2%, without taking into account loss at the optically polished surface.

When the shape of the optical element is a prismatic columnar shape, it has a length of, for example, 10 mm in the optical axis direction and the size of the cross-sectional area that intersects perpendicularly to the optical axis direction is, for example, 5×5 $mm^2$. Furthermore, the direction in which the optical element is cut out from the crystal is, for example, ($\theta$, $\phi$)=(61.9°, 45°). The optical surface of the optical element has been optically polished by the method described later. The length of the optical element is not particularly limited and may be, for example, 1 mm, 5 mm, 12 mm, or 15 mm in addition to 10 mm as described above. Moreover, the shape of the optical element also is not particularly limited. It may be a shape formed by, for example, processing the input/output end facet to have a Brewster angle, in addition to the aforementioned prismatic columnar shape.

In an embodiment of the present invention, the transmittance (Ta) and the transmittance (Ts) can be measured with, for example, a Fourier transform infrared spectrophotometer.

Preferably, the crystal of an embodiment of the present invention has an optical surface that has been optically polished. The optical polishing is not particularly limited but a treatment is preferable in which the optical surface is mechanically polished and the surface layer including abrasive grains buried therein and strains caused by the mechanical polishing are removed by, for example, ion beam irradiation or etching with a chemical solvent.

The method of manufacturing the crystal according to an embodiment of the present invention is described using a CLBO crystal as an example. Cesium-lithium-borate crystals other than the CLBO crystal also can be manufactured according to the following.

First, a CLBO crystal may be prepared. The method of growing a CLBO crystal is not particularly limited and, for example, methods may be employed such as the methods described in JP 2744604 B or JP 3115250 B, each of which is incorporated herein by reference in its entirety. JP 2812427 B is also incorporated herein by reference in its entirety. Subsequently may be carried out a first moisture removal step in which the CLBO crystal is heated in the atmosphere at 100° C. or higher for at least 24 hours and a second moisture removal step in which the crystal is heated in the dry gas atmosphere at 100° C. or higher for at least 24 hours.

In the first moisture removal step, the heating condition is preferably 20 to 300° C. or 100 to 300° C. for 1 to 200 hours or 24 to 200 hours, more preferably 90 to 250° C. or 100 to 250° C. for 15 to 150 hours or 24 to 150 hours, and further preferably 140 to 160° C. for 24 to 130 hours. It may not be possible to remove moisture up to the level in which the Ta is at least 1%, by only the first moisture removal step in which the crystal is heated in the atmosphere.

In the second moisture removal step, the heating condition is preferably 20 to 300° C. or 100 to 300° C. for 1 to 300 hours or 24 to 300 hours, more preferably 90 to 250° C. or 100 to 250° C. for 24 to 200 hours, and further preferably 140 to 160° C. for 70 to 200 hours. The type of the dry gas is as described above. The measure of the degree of dryness of the dry gas is, for example, a purity of at least 99.9%, preferably a purity of at least 99.99%, and further preferably a purity of at least 99.999%. The second moisture removal step is carried out preferably in an airtight container with the dry gas flowing and may be carried out inside an optical cell as described later. The level of flow of the dry gas is, for example, in the range of 1 to 10000 ml/min, preferably in the range of 10 to 600 ml/min, and more preferably in the range of 20 to 600 ml/min. It is not preferable that the second moisture removal step be carried out in a short time, specifically, less than 24 hours, since moisture is removed rapidly and thereby the optical surface along the a-axis direction at the crystal surface may be deteriorated. When the second moisture removal step is carried out while vacuum evacuation is performed, moisture may be removed in a short time. In the case of the vacuum evacuation, the degree of vacuum is, for example, $10^{-1}$ Torr or lower, preferably $10^{-2}$ Torr or lower, and further preferably $10^{-3}$ Torr or lower. When the first moisture removal step is heated in the atmosphere at 150° C. for 24 hours, it also is possible to reduce the time required for all the steps including the subsequent second moisture removal step.

In the first moisture removal step and the second moisture removal step, for example, the CLBO crystal may be heated in the atmosphere at 150° C. for 120 hours (first moisture removal step) and subsequently, may be heated at 150° C. for 72 hours with argon gas flowing at an average rate of 30 ml/min (second moisture removal step), or otherwise the CLBO crystal may be heated in the atmosphere at 150° C. for 96 hours (first moisture removal step) and subsequently, may be heated at 150° C. for 72 hours with oxygen gas flowing at an average rate of 600 ml/min (second moisture removal step).

Next, examples of the wavelength conversion device according to embodiments of the present invention are described with reference to drawings. The present invention, however, is not limited by the following examples of the wavelength conversion device.

Figure 4:
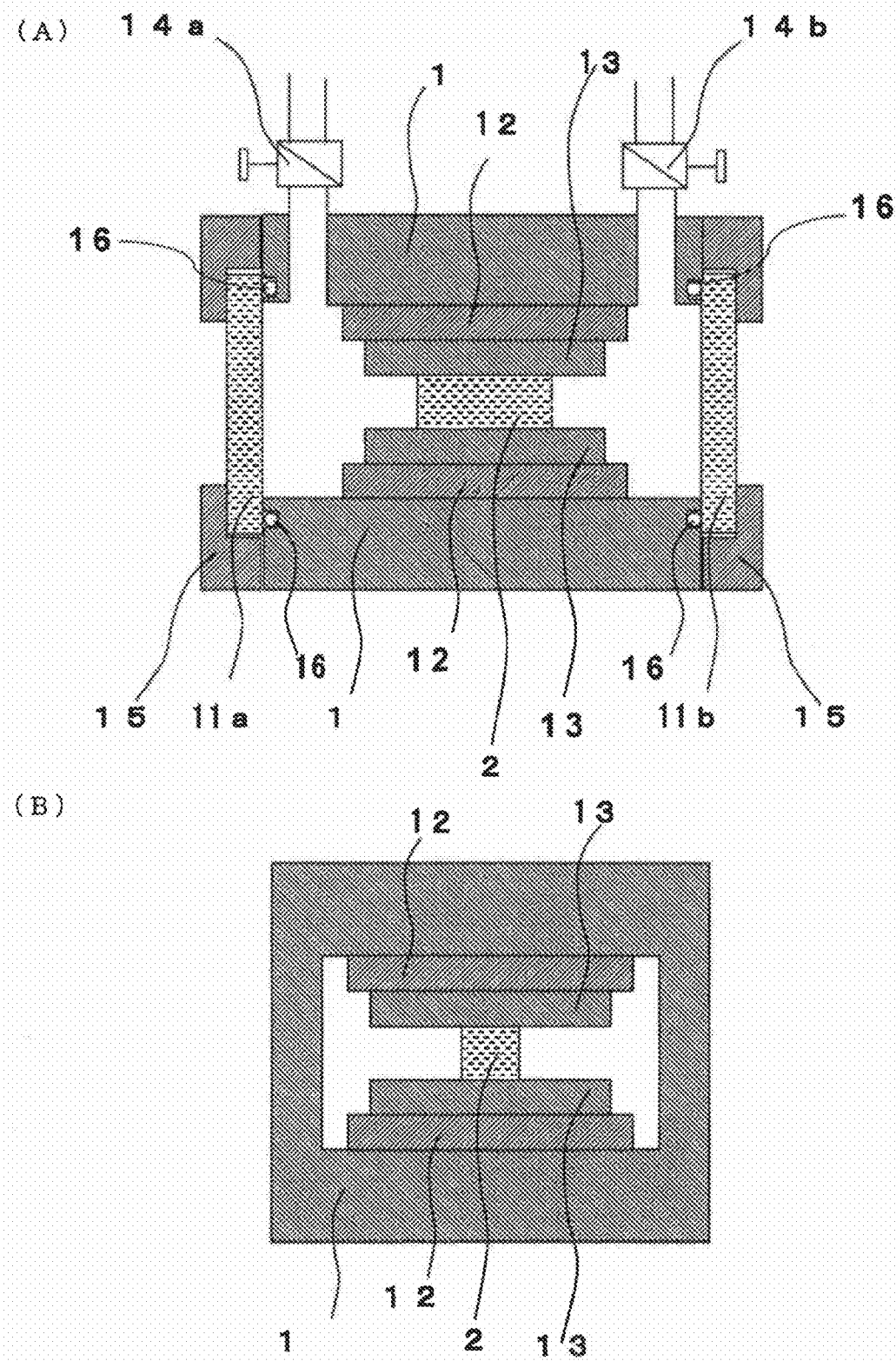
FIG. 4A shows a longitudinal cross-sectional view illustrating the configuration of an example of the wavelength conversion device according to an embodiment of the present invention.
FIG. 4B shows a transverse cross-sectional view illustrating the configuration of an example of the wavelength conversion device according to an embodiment of the present invention.

An example of the wavelength conversion device according to an embodiment of the present invention is shown in the cross-sectional views in FIG. 4. FIG. 4(A) is a longitudinal sectional view, and FIG. 4(B) is a transverse sectional view. As shown in the drawings, the wavelength conversion device in this embodiment has a configuration in which an optical wavelength conversion element 2 produced using a CLBO crystal is disposed inside an optical cell 1. In the wavelength conversion device, an optical cell with a prismatic columnar shape is used, and an optical window 11a is disposed on one side thereof (on the left side in FIG. 4(A)) and an optical window 11b is disposed on the other side (on the right side in FIG. 4(A)). Each of the optical windows 11a and 11b is fixed with a window holder 15 and both the optical windows 11a and 11b are in contact with the optical cell 1 through O-rings 16. Accordingly, the inside of the optical cell 1 may be in a hermetically-sealed state. Gas introduction tubes are disposed at both ends of the upper part of the optical cell 1 and are equipped with sealing valves 14a and 14b, respectively. Two heaters 12 are disposed inside the optical cell 1 and a Peltier element 13 is arranged on each of the two heaters 12. The optical wavelength conversion element 2 is disposed between and in contact with the two Peltier elements 13. Inside the optical cell 1, for example, vacuum evacuation, atmosphere gas displacement, and atmosphere gas flow can be carried out with the gas introduction tubes and sealing valves 14a and 14b. The optical windows 11a and 11b are formed of a window material, for example, quartz or calcium fluoride and the optical windows 11a and 11b may be provided with an antireflection film with respect to at least one of an incident laser and an ultraviolet laser. The laser input/output direction is not particularly limited.

For example, a source laser may be incident through the optical window 11b (the optical window located on the right side in FIG. 4(A)) to enter the optical wavelength conversion element 2 where an ultraviolet laser is then generated through wavelength conversion, and the ultraviolet laser may be emitted to the outside through the optical window 11a (the optical window located on the left side in FIG. 4(A)). The type of the heaters 12 is not particularly limited. For example, heaters for heating a crystal, such as heating wires or ceramic heaters, may be used. The Peltier elements 13 serve to control the temperature of the optical wavelength conversion element 2 more precisely. Generally, temperature control performed with the heaters 12 is accompanied by an error of approximately ±1° C. However, since the error in the temperature control performed with the Peltier elements 13 is approximately ±0.1° C. or smaller, highly precise temperature control can be carried out. Furthermore, a temperature sensor for the heaters and a temperature sensor for the Peltier elements may be disposed inside the optical cell 1 although they are not shown in the drawings. These sensors may be electrically connected to a temperature controller (not shown) that may be disposed outside the optical cell 1. Similarly, the heaters 12 and the Peltier elements 13 may also be electrically connected to the temperature controller. The temperature controller controls the temperatures of the heaters 12 and the Peltier elements 13 according to the temperature information from both the sensors. Furthermore, it also is possible that a temperature program is input to the temperature controller beforehand, and the temperature controller controls the temperatures according to the program.

In this wavelength conversion device, for example, a moisture removal treatment can be carried out with respect to the optical wavelength conversion element 2, such as a CLBO crystal, by the aforementioned method and thereafter, the wavelength conversion can be carried out. For instance, first, a CLBO crystal that has not been subjected to a moisture removal treatment may be disposed inside the optical cell 1. In the state where the sealing valves 14a and 14b are opened, the first moisture removal step is carried out with the heaters 12 and the Peltier elements 13 through heating at 100° C. or higher for at least 24 hours. Thereafter, a dry gas such as argon gas or oxygen gas, for example, is introduced into the optical cell 1 through the sealing valves 14a and 14b and the gas introduction tubes. In the state where the dry gas is flowing, the second moisture removal step is carried out through heating at 100° C. or higher for at least 24 hours. Thus the optical wavelength conversion element 2 of an embodiment of the present invention may be obtained.

Thereafter, an atmosphere gas in which the content of nitrogen gas is less than that in air is introduced and the sealing valves 14a and 14b are then closed to bring the inside of the optical cell 1 into a hermetically-closed state and the temperature inside the optical cell 1 is decreased to room temperature. In this state, the optical wavelength conversion element 2 is irradiated with laser emitted from a light source (not shown) through the optical window 11b and ultraviolet laser generated in the optical wavelength conversion element 2 is emitted to the outside through the optical window 11a. In this wavelength conversion, it is preferable that the temperature of the optical wavelength conversion element 13 be controlled precisely with the Peltier elements 13. As described above, in the present invention, since the wavelength conversion can be carried out at room temperature, the device can be started up in a short time and thus is excellent in operability.

Figure 5:
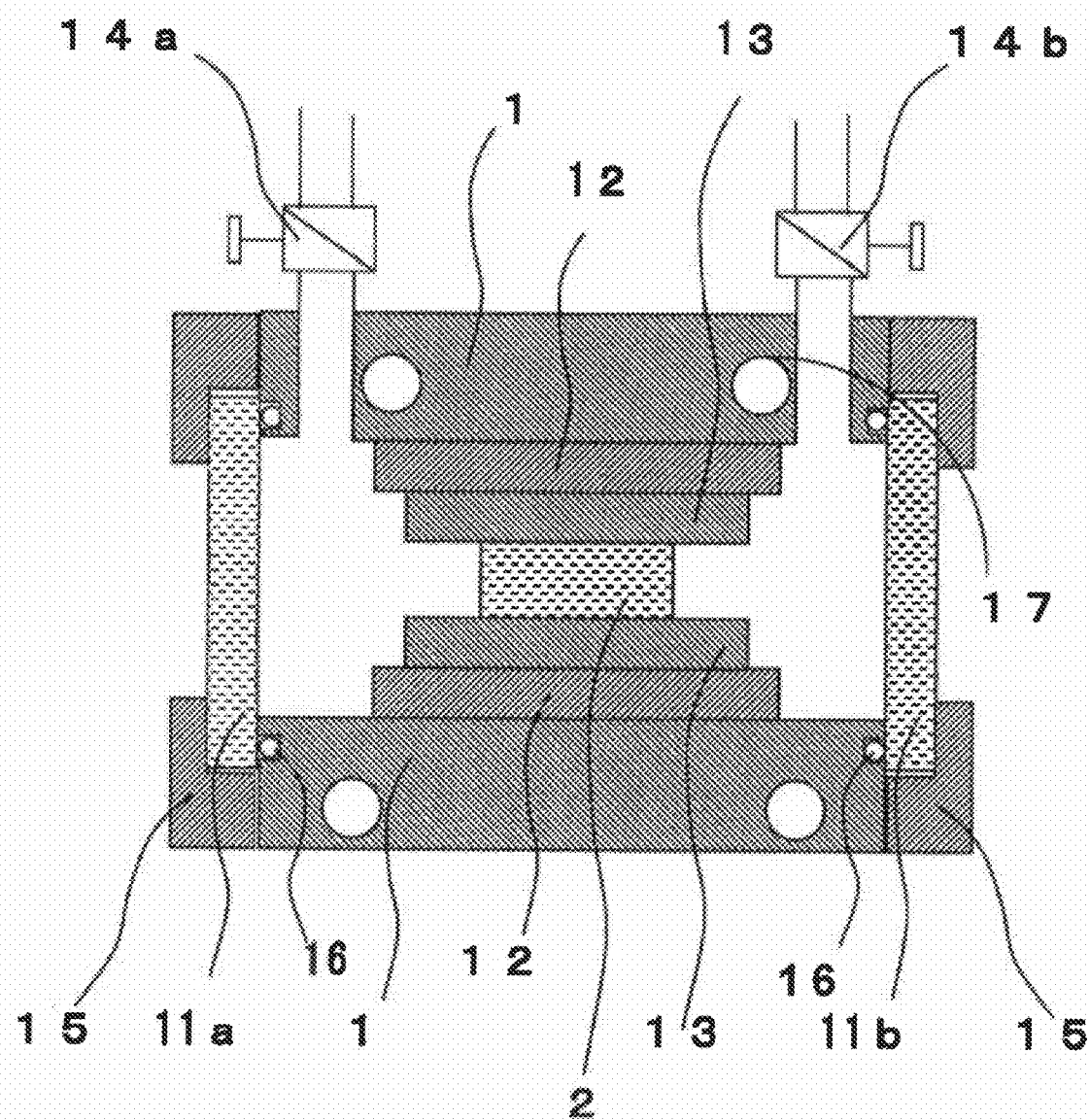
FIG. 5 is a cross-sectional view showing the configuration of another example of the wavelength conversion device according to an embodiment of the present invention.

In the wavelength conversion device of this example, the heaters 12 were used, but Peltier elements may be used instead of the heaters 12 for the purpose of controlling the temperature more precisely. Moreover, the wavelength conversion device of this example is not equipped with a cooling unit. However, preferably, it is equipped with a cooling unit that is provided by circulating a cooling medium such as water. An example of the wavelength conversion device equipped with a cooling unit is shown in the cross-sectional view in FIG. 5. In FIG. 5, identical parts to those shown in FIG. 4 are indicated with identical numerals and characters. As shown in FIG. 5, in this wavelength conversion device, the optical cell 1 is provided with water channels 17 for circulating water that serves as a cooling medium. A cooling unit provided in this manner makes it possible to control the temperature further precisely and can quickly cool the inside of the optical cell 1 that is in a heated state due to the moisture removal treatment of, for example, a CLBO crystal. As a result, the device has further excellent operability.

Another example of the wavelength conversion device according to an embodiment of the present invention is shown in the cross-sectional view in FIG. 6. In FIG. 6, identical parts to those shown in FIGS. 4 and 5 are indicated with identical numerals and characters. In this wavelength conversion device, an optical window 11a located on the side from which ultraviolet laser is emitted is placed at a Brewster angle and thereby the reflection of the ultraviolet laser at the optical window 11a located on the emission side is reduced. The optical window located on the side from which ultraviolet laser is emitted may be provided with an antireflection film to be placed for reducing the reflection of the ultraviolet laser. In this case, however, there may be a problem in that the antireflection film is deteriorated by the ultraviolet laser. In order to solve this problem, the optical window located on the emission side is placed at the Brewster angle and thereby the reflection of ultraviolet rays can be reduced with or without providing an antireflection film. However, even in this case, a part of incident light is reflected by the optical window 11a located on the emission side. Therefore, the vicinity of the optical window located on the emission side of the optical cell 1 may be heated. This heating and heat generated in the heaters 12 and the Peltier elements 13 may heat the O-rings 16 located on the emission side to generate out gas. Accordingly, in order to prevent heating of the O-rings 16, it is preferable that the water channels 17 be provided close to the O-rings 16.

EXAMPLE 1

Next, an example of an embodiment of the present invention is described together with comparative examples. The present invention, however, is not limited by the following example and comparative examples by any means.

First, a CLBO crystal was cut in the orientation of (θ, φ)=(61.9°, 45°) and was then optically polished, and thereby a 10-mm long element with a cross-section of 5×5 mm² was obtained. This element was placed inside the optical cell 1 of the wavelength conversion device shown in FIG. 4 and was heated in the atmosphere at 150° C. for 120 hours. Thereafter, the atmosphere gas was replaced by argon gas, and the element further was heated at 150° C. for 72 hours, with the argon gas being allowed to flow at a flow rate of 25 ml/min. Thus, an optical wavelength conversion element of this example was obtained. With respect to this optical wavelength conversion element, the transmission spectrum was measured with unpolarized infrared light using a Fourier transform infrared spectrophotometer. In this measurement, the measured transmittance was taken as the measured value without taking the reflection loss at the element end facet (optical surface) into consideration. On the other hand, the transmission spectrum measured immediately after the element was heated in the atmosphere at 150° C. was employed as Comparative Example 1. The transmission spectrum measured after the element was heated at 150° C. for 120 hours was employed as Comparative Example 2. These measurement results are shown in the graph in FIG. 1.

In FIG. 1, curve "c" indicates the transmission spectrum of the present example, curve "a" indicates the transmission spectrum of Comparative Example 1, and curve "b" indicates the transmission spectrum of Comparative Example 2. In FIG. 1, lines va and vs indicate the wavelengths at which the transmittance (Ta) and transmittance (Ts) were measured. As shown in FIG. 1, in the present example (c), the transmittance (Ta) at 3589 cm$^{-1}$ exceeded 1% and the transmittance (Ts) at a wavenumber of 3435 cm$^{-1}$ exceeded 1.5%. On the other hand, in both Comparative Examples 1 and 2, Ta was nearly zero and Ts also was lower than 1.5%.

The method of producing the CLBO crystal in this example is as follows. That is, first, a raw material is prepared by a method that includes mixing crude raw materials such as cesium carbonate, lithium carbonate, and boric acid to have a self-flux composition obtained by changing one of component ratios from a chemical formula. In this case, a method may be used in which after the raw material is dissolved in water to be mixed therein, it is dried and thereby a sintering reaction is carried out. The raw material for growing a crystal is placed in a platinum crucible and is melted at 900° C., which is cooled to around 850° C. After a seed crystal is brought into contact with the surface thereof, the whole solution is cooled at a rate of approximately 0.1° C./day and thereby a crystal is grown. When the crystal is grown for approximately two weeks by this method, a crystal with a size of approximately 75×43×30 mm³ can be obtained.

Next, with respect to the element of the present example and the element of Comparative Example 2, a change in ultraviolet laser output power caused by a change in source laser input power was measured. Laser emitted from a Nd:YAG laser was allowed to enter a $LiB_3O_5$ crystal and thereby the wavelength thereof was converted. Thus a 532-nm laser was generated. The element was irradiated therewith and the power (W) of ultraviolet laser (266 nm) generated thereby was measured. In this case, the temperature of the element was set at 150° C. The incident laser (532 nm) has a maximum average output power of 16 W, a pulse width of 90 ns, and a pulse repetition frequency of 50 kHz. Furthermore, irradiation with laser (532 nm) was carried out using a condensing lens with a focal length of 56.0 mm under a condition in which the laser was highly condensed at the center portion of the element. In this measurement, the angle of the element was adjusted to satisfy a condition in which ultraviolet laser was generated best when the input power of the laser (532 nm) was 2 W. This measurement result is shown in the graph in FIG. 2.

Figure 2:
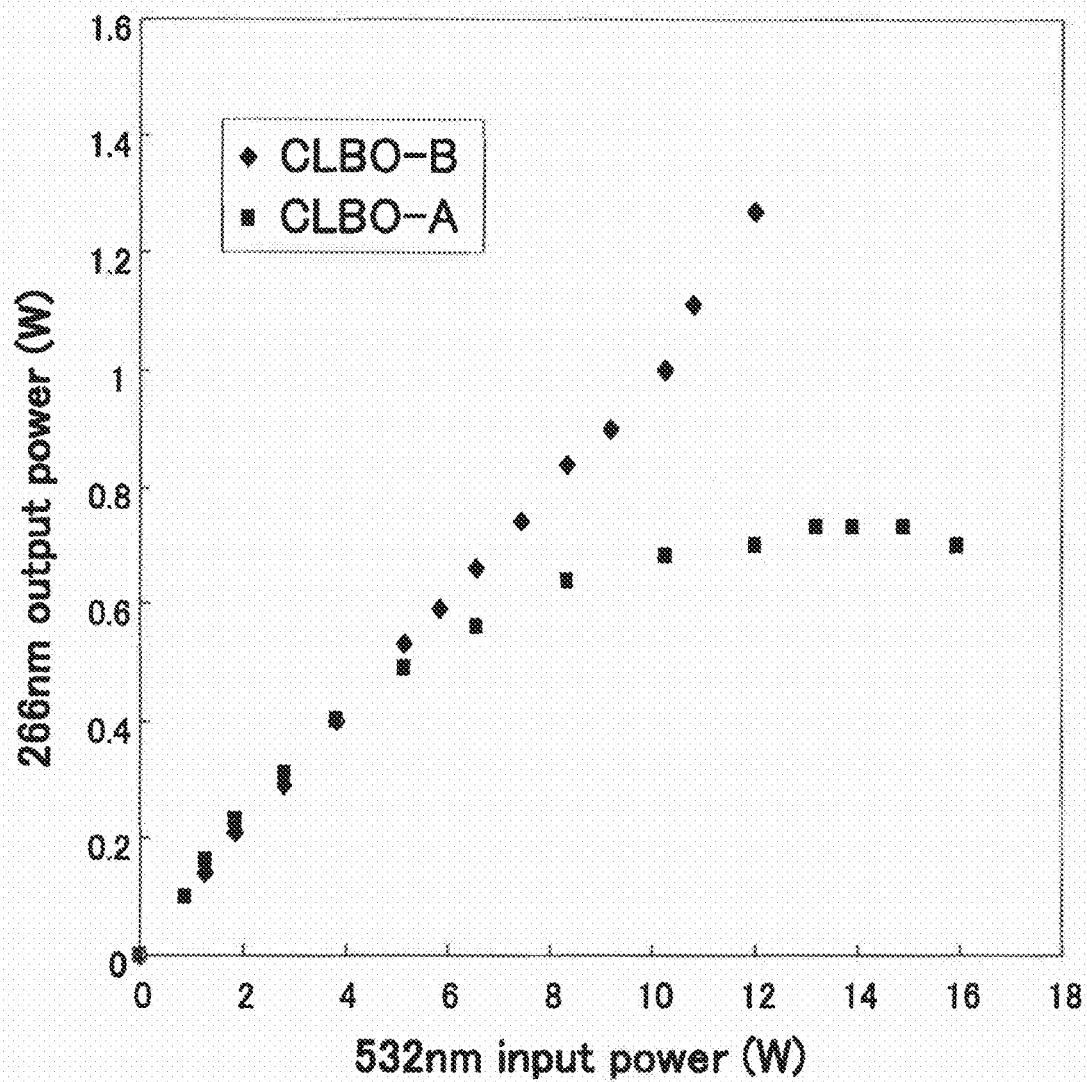
FIG. 2 is a graph showing the measurement results of output power of ultraviolet lasers according to one example of the present invention.

In FIG. 2, curve "CLBO-B" indicates an input/output power curve of the present example, and curve "CLBO-A" indicates an input/output power curve of Comparative Example 2. Furthermore, in FIG. 2, the horizontal axis indicates the input power (W) of laser (532 nm), and the vertical axis indicates the output power (W) of ultraviolet laser (266 nm). As shown in FIG. 2, in Comparative Example 2 (CLBO-A), as in the case of a conventional CLBO crystal, when the input power increased to some extent, the power of ultraviolet laser stopped increasing. This is a phenomenon in which a slight absorption of ultraviolet light generated by itself causes a nonuniform temperature distribution inside the crystal, and as a result, the region contributing to the ultraviolet generation is reduced, which results in saturation of output power. This phenomenon is seen in conventional CLBO crystals in general. When such an absorption phenomenon occurs, it is necessary to adjust the angle of the element to the orientation in which an ultraviolet laser is generated best with respect to the incident direction. The same measurement was carried out using a CLBO crystal that had not been heated, and the result was same as that obtained in Comparative Example 2. On the other hand, as shown in FIG. 2, in the case of the present example (CLBO-B), output power did not show a tendency of saturation and the output power increased according to the input power. This result can denote that the self-heating phenomenon is suppressed to a very small extent in the element of the present example. The mechanism in which the vibration (va) of water impurities observed in the infrared region considerably affects the ultraviolet light absorption properties as described above has not been clear.

Next, under the two temperature conditions, a heating condition (150° C.) and a room temperature (35° C.) condition, the element of the present example was used to perform wavelength conversion and the power (W) of the ultraviolet laser generated thereby was measured. Argon gas was used as the atmosphere gas in which the element was placed during the measurement. The conditions for the wavelength conversion were the same as described above. The result is shown in the graph in FIG. 3.

Figure 3:
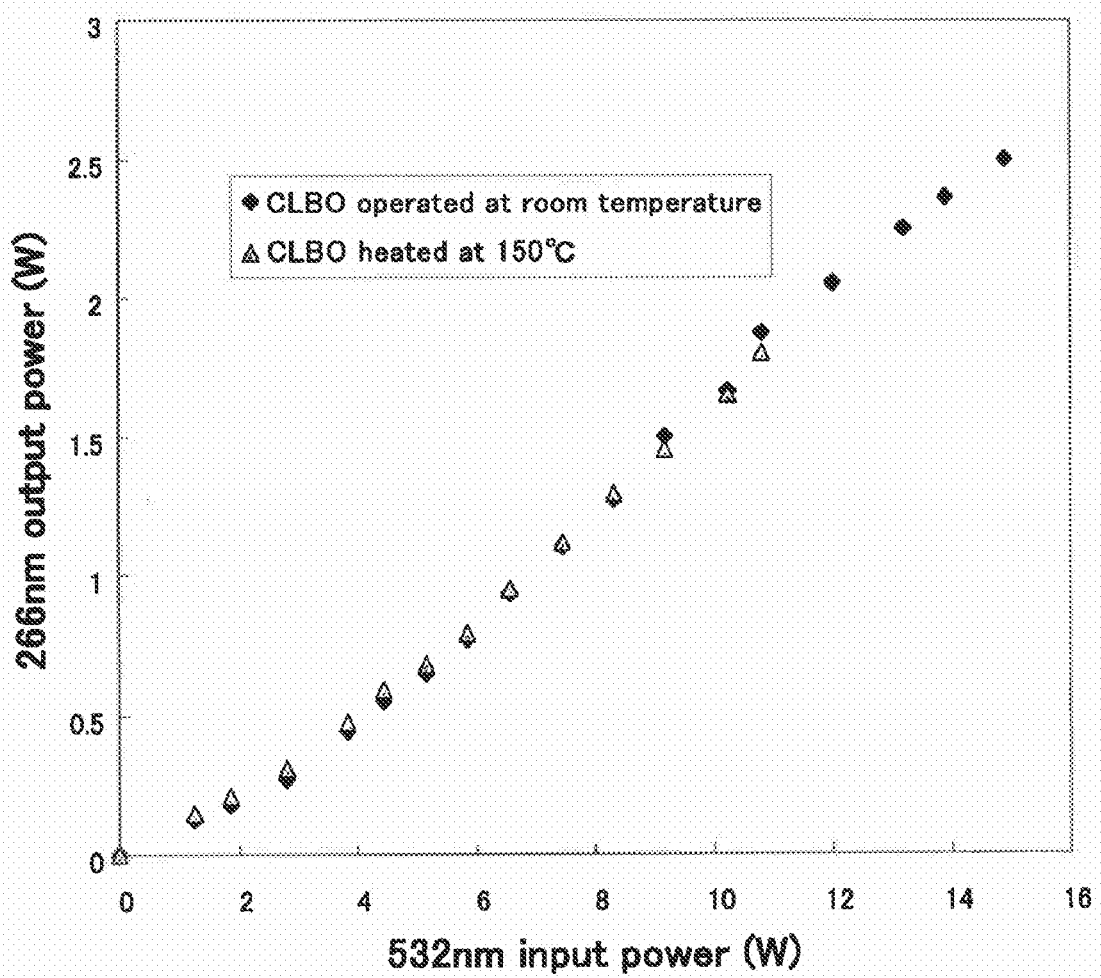
FIG. 3 is a graph showing the measurement results of output power of ultraviolet lasers according to one example of the present invention.

In FIG. 3, the horizontal axis indicates the input power (W) of laser (532 nm), and the vertical axis indicates the output power (W) of ultraviolet laser (266 nm). As shown in FIG. 3, even at room temperature, the element of the present example exhibited output characteristics that were equal to or higher than those obtained under the 150° C. heating condition.

This example was described using an example in which a 10-mm long element was employed. However, elements with other lengths may be used as long as the transmittance (Ta) at 3589 cm$^{-1}$ in the infrared transmission spectrum is at least 1%. These elements allow the same effect as in this example to be obtained.

Furthermore, this example was described using an example in which a CLBO crystal was cut in the orientation, (θ, φ)= (61.9°, 45°), that allows fourth harmonic (266 nm) of a Nd:YAG laser to be generated. For example, however, in an alternative embodiment of the present invention, the CLBO crystal may be cut in the orientation that allows fifth harmonic (213 nm) of a Nd:YAG laser to be generated, which allows the same effect to be obtained as in this example.

Numerous modifications and variations of the present invention are possible in light of the above teachings. It is therefore to be understood that within the scope of the appended claims, the invention may be practiced otherwise than as specifically described herein.

The invention claimed is:

1. An optical wavelength conversion element comprising:
a water-impurity controlled cesium-lithium-borate crystal,
a transmittance (Ta) at 3589 cm$^{-1}$ in an infrared transmission spectrum of the optical element which is independent of a polarization direction is at least 1%, without taking into account loss at an optically polished surface of the crystal,
wherein the transmittance Ta is measured after processing the crystal into a 10-mm long optical element cut in an orientation to generate a fourth harmonic of a Nd:YAG laser.

2. The optical wavelength conversion element according to claim 1, wherein a transmittance (Ts) at 3435 cm$^{-1}$ in the infrared transmission spectrum of the optical element which is independent of a polarization direction, is at least 1.5%, without taking into account loss at an optically polished surface of the crystal,
wherein the transmittance Ts is measured after processing the crystal into a 10-mm long optical element cut in an orientation to generate a fourth harmonic of a Nd:YAG laser.

3. A method of manufacturing an optical wavelength conversion element according to claim 1, the method comprising:
preparing the cesium-lithium-borate crystal;
a first moisture removing process of heating the crystal in the atmosphere at 100° C. or higher for at least 24 hours; and
a second moisture removing process of heating the crystal under a dry gas atmosphere at 100° C. or higher for at least 24 hours.

4. A wavelength conversion device that converts a wavelength of light by transmitting the light through an optical wavelength conversion element,
wherein the optical wavelength conversion element is an optical wavelength conversion element according to claim 1.

5. The wavelength conversion optical device according to claim 4, further comprising:
an optical cell provided with input and output optical windows, the optical wavelength conversion element being disposed inside the optical cell, wherein the optical cell further comprises a temperature control unit and an atmosphere gas displacement unit,
wherein a moisture removal treatment can be carried out that includes a process of disposing a cesium-lithium-borate crystal inside the optical cell, with the crystal having not been subjected to a moisture removal treatment, a first moisture removal process in which the crystal is heated with the temperature control unit in the atmosphere at 100° C. for at least 24 hours, and a second moisture removing process in which an inside of the optical cell is brought into a dry gas atmosphere with the atmosphere gas displacement unit and the crystal is then heated with using the temperature control unit at 100° C. or higher for at least 24 hours.

6. The wavelength conversion device according to claim 4, wherein the crystal converts the wavelength at room temperature.

7. The wavelength conversion device according to claim 4, wherein the crystal converts the wavelength while the crystal is in an atmosphere of gas in which the content of nitrogen gas is less than that in air.

8. An ultraviolet laser irradiation apparatus comprising:
a laser light source; and
a wavelength conversion device that converts a wavelength of light emitted from the laser light source to generate an ultraviolet laser,
wherein the wavelength conversion device is a wavelength conversion device according to claim 4.

9. A laser processing system comprising:
an ultraviolet laser irradiation apparatus,
wherein the ultraviolet laser irradiation apparatus is an ultraviolet laser irradiation apparatus according to claim 8.

* * * * *